(12) United States Patent
Li et al.

(10) Patent No.: US 12,164,196 B2
(45) Date of Patent: Dec. 10, 2024

(54) DISPLAY MODULE AND PREPARING METHOD THEREFOR, AND DISPLAY DEVICE

(71) Applicants: Beijing BOE Display Technology Co., Ltd., Beijing (CN); BOE Technology Group Co., Ltd., Beijing (CN)

(72) Inventors: Lei Li, Beijing (CN); Hang Xia, Beijing (CN); Jian Ren, Beijing (CN); Zongying Shu, Beijing (CN); Liang Xiao, Beijing (CN); Le Zhang, Beijing (CN); Lu Gao, Beijing (CN); Mang Fu, Beijing (CN); Quanzhou Liu, Beijing (CN); Boning Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/796,272

(22) PCT Filed: Sep. 10, 2021

(86) PCT No.: PCT/CN2021/117821
§ 371 (c)(1),
(2) Date: Jul. 29, 2022

(87) PCT Pub. No.: WO2023/035249
PCT Pub. Date: Mar. 16, 2023

(65) Prior Publication Data
US 2024/0184166 A1 Jun. 6, 2024

(51) Int. Cl.
*G02F 1/13357* (2006.01)

(52) U.S. Cl.
CPC .............. *G02F 1/133608* (2013.01)

(58) Field of Classification Search
CPC ........ G02F 1/133608; G02F 1/133314; G02F 1/133317; G02F 1/1336; G02F 1/1333; G02F 1/133308
See application file for complete search history.

(56) References Cited

U.S. PATENT DOCUMENTS 7,762,709 B2 * 7/2010 Huang .............. G02F 1/133608
362/217.1
10,216,038 B2 * 2/2019 Liu .................. B29C 45/14344
(Continued)

FOREIGN PATENT DOCUMENTS

CN 101504119 A 8/2009
CN 105467677 A 4/2016
(Continued)

*Primary Examiner* — Zheng Song
(74) *Attorney, Agent, or Firm* — Ling Wu; Stephen Yang; Ling and Yang Intellectual Property

(57) ABSTRACT

A display module, a preparing method therefor and a display device are provided. The display module includes a back plate and a mold frame, the back plate includes a base plate, the base plate includes an edge region, the mold frame is disposed on the edge region, the edge region is provided with a rough structure region, the rough structure region includes multiple rough structures, an orthographic projection of at least part of the rough structures on the base plate overlaps with an orthographic projection of the mold frame on the base plate, and a material of the mold frame fills at least part of space of the rough structures.

19 Claims, 7 Drawing Sheets

(56) References Cited

U.S. PATENT DOCUMENTS

| | | | |
|---|---|---|---|
| 2007/0064448 A1* | 3/2007 | Yu | G02B 6/0065 |
| | | | 362/613 |
| 2008/0278895 A1* | 11/2008 | Woo | G02F 1/133308 |
| | | | 361/679.02 |
| 2009/0122217 A1* | 5/2009 | Chen | G02F 1/133308 |
| | | | 349/58 |
| 2009/0219724 A1* | 9/2009 | Wang | G02F 1/133308 |
| | | | 362/362 |
| 2010/0135039 A1* | 6/2010 | Li | G02B 6/0055 |
| | | | 362/606 |
| 2013/0083275 A1* | 4/2013 | Ai | G02F 1/133308 |
| | | | 349/106 |
| 2016/0147007 A1* | 5/2016 | Hong | G02B 6/0036 |
| | | | 362/606 |
| 2016/0207236 A1* | 7/2016 | Tsubota | B32B 3/266 |
| 2019/0384114 A1* | 12/2019 | Takeuchi | G02F 1/133305 |

FOREIGN PATENT DOCUMENTS

| | | | | |
|---|---|---|---|---|
| CN | 207882629 U | | 9/2018 | |
| CN | 109283744 A | | 1/2019 | |
| CN | 209606751 U | | 11/2019 | |
| CN | 114093244 | * | 2/2022 | G09F 9/00 |
| JP | 2004-240239 A | | 8/2004 | |
| TW | 200937079 A | | 9/2009 | |

* cited by examiner

DISPLAY MODULE AND PREPARING METHOD THEREFOR, AND DISPLAY DEVICE

CROSS-REFERENCE TO RELATED APPLICATION

The present application is a U.S. National Phase Entry of International Application PCT/CN2021/117821 having an international filing date of Sep. 10, 2021 and entitled "Display Module and Preparing Method Therefor, and Display Device", and the contents disclosed in the above-mentioned application are hereby incorporated as a part of this application.

TECHNICAL FIELD

The present disclosure relates to, but is not limited to, the field of display technology, and in particular to a display module, a method for preparing the display module, and a display device.

BACKGROUND

In recent years, with continuous development of display technology, an application scope of display devices is also expanding, such as smart phones, smart bracelets, smart TVs, vehicle-mounted displays, and the like. With a prosperous automobile market, demands for matching large-screen central controls and dashboards are increasing to meet people's demand for cars. Nowadays, vehicle-mounted touch control displays are gradually developing towards multi-forms such as large screen, high definition, narrow bezel, and the like.

At present, a back plate and a mold frame are generally bound and fixed through a glue inlet hole. Since bezels are getting narrower and narrower, which causes that the glue inlet hole is designed to be getting smaller and smaller, a binding force between the back plate and the mold frame becomes worse, producing wrinkles of film materials, and there is water vapor entering from a gap at a junction between the back plate and the mold frame, making sealing performance of a module worse, thus a problem such as a failure of a display picture or the like is caused.

SUMMARY

The following is a summary of subject matters described herein in detail. The summary is not intended to limit the protection scope of claims.

In a first aspect, an embodiment of the present disclosure provides a display module, including a back plate and a mold frame, wherein the back plate includes a base plate, the base plate includes an edge region, the mold frame is disposed on the edge region, the edge region is provided with a rough structure region, the rough structure region includes multiple rough structures, an orthographic projection of at least part of the rough structures on the base plate overlaps with an orthographic projection of the mold frame on the base plate, and a material of the mold frame fills at least part of space of the rough structures.

In an exemplary embodiment, each rough structure is a groove at micro-nano scale.

In an exemplary embodiment, a cross-sectional shape of the groove perpendicular to a plane where the rough structure region is located includes at least one of a U-shape, an arc shape, and a V-shape.

In an exemplary embodiment, an average area of an opening of the rough structure in the rough structure region is within a range of 1.5 square microns to 11.5 square microns.

In an exemplary embodiment, the edge region is provided with a glue inlet hole, the glue inlet hole penetrates the base plate, the material of the mold frame fills at least part of space of the glue inlet hole, and rough structure region is provided to surround the glue inlet hole.

In an exemplary embodiment, an opening of the glue inlet hole is circular, and a diameter of the opening of the glue inlet hole is 0.45 mm to 0.6 mm.

In an exemplary embodiment, the rough structure region is provided to surround the glue inlet hole.

In an exemplary embodiment, the base plate is not provided with a glue inlet hole.

In an exemplary embodiment, the rough structure region is in a closed ring shape on the edge region.

In the exemplary embodiment, a backlight assembly is further included, the base plate further includes a central region, the edge region is located around the central region, the backlight assembly is disposed on the central region, and the mold frame surrounds the backlight assembly.

In an exemplary embodiment, a display panel is further included, wherein the display panel is disposed on a side of the mold frame away from the base plate.

In an exemplary embodiment, the back plate further includes a side plate, wherein the side plate is located at a peripheral side on the base plate, a side of the mold frame close to the side plate is provided with a boss, the boss is located at an end of the side plate away from the base plate, and a vertical projection of the boss on the base plate at least partially overlaps with a vertical projection of the side plate on the base plate.

In a second aspect, an embodiment of the present disclosure provides a method for preparing a display module, including: forming a back plate, wherein the back plate includes a base plate, and the base plate includes an edge region; forming a rough structure on at least part of the edge region; forming a mold frame on the edge region, and filling at least part of the mold frame in the rough structure.

In an exemplary embodiment, the rough structure is formed on at least part of the edge region by an electrochemical processing process.

In a third aspect, an embodiment of the present disclosure further provides a display device, including the aforementioned display module.

Other aspects may be understood upon reading and understanding of the drawings and the detailed description.

BRIEF DESCRIPTION OF DRAWINGS

Accompanying drawings are used for providing understanding of technical solutions of the present disclosure, and form a part of the specification. They are used for explaining the technical solutions of the present disclosure together with the embodiments of the present disclosure, and do not form a limitation on the technical solutions of the present disclosure.

DETAILED DESCRIPTION

The embodiments of the present disclosure will be described in detail below with reference to the drawings. It is to be noted that implementation modes may be implemented in multiple different forms. Those of ordinary skills in the art may easily understand such a fact that embodiments and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict.

In the specification, for convenience, wordings indicating directional or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements may be changed as appropriate according to directions according to which the constituent elements are described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or an internal communication between two components. Those of ordinary skills in the art may understand meanings of the above-mentioned terms in the present disclosure according to situations.

In the present disclosure, "about" refers to that a boundary is defined not so strictly and numerical values within process and measurement error ranges are allowed.

Figure 1:
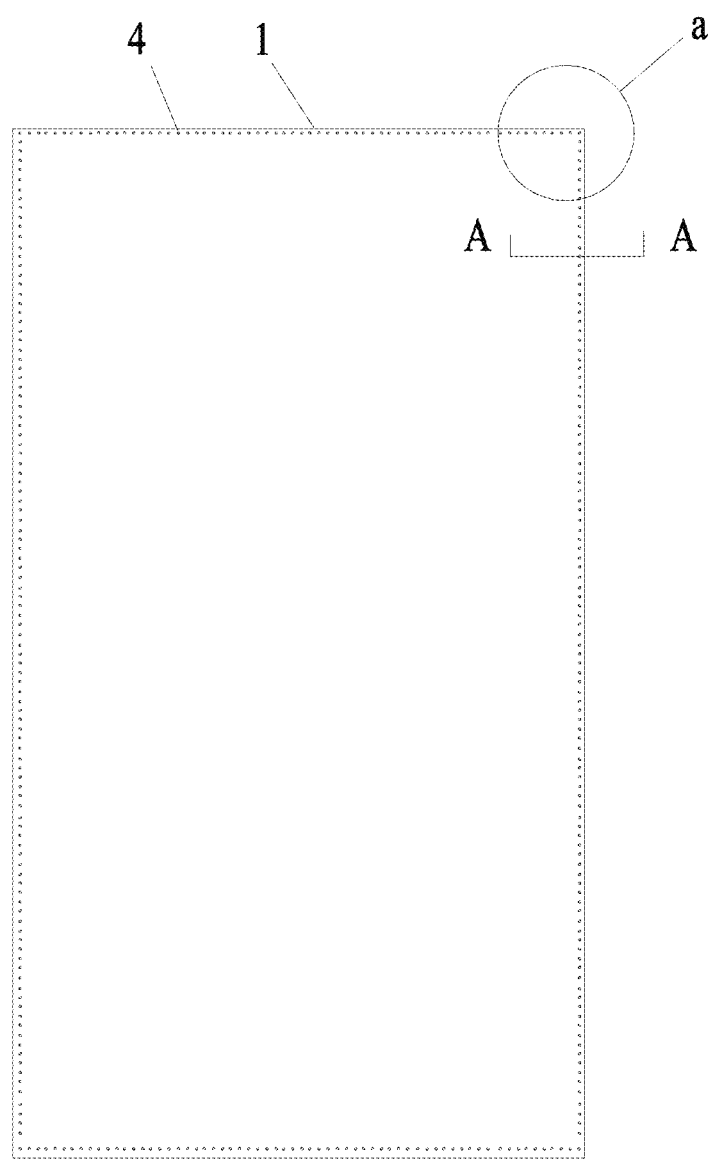
FIG. 1 is a schematic diagram of a structure of a display module in a related art.
Figure 2:
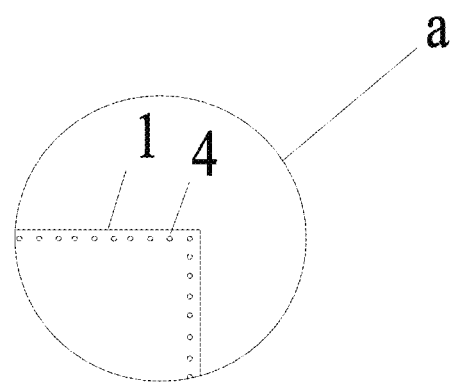
FIG. 2 is an enlarged view of a display module in a related art.
Figure 3:
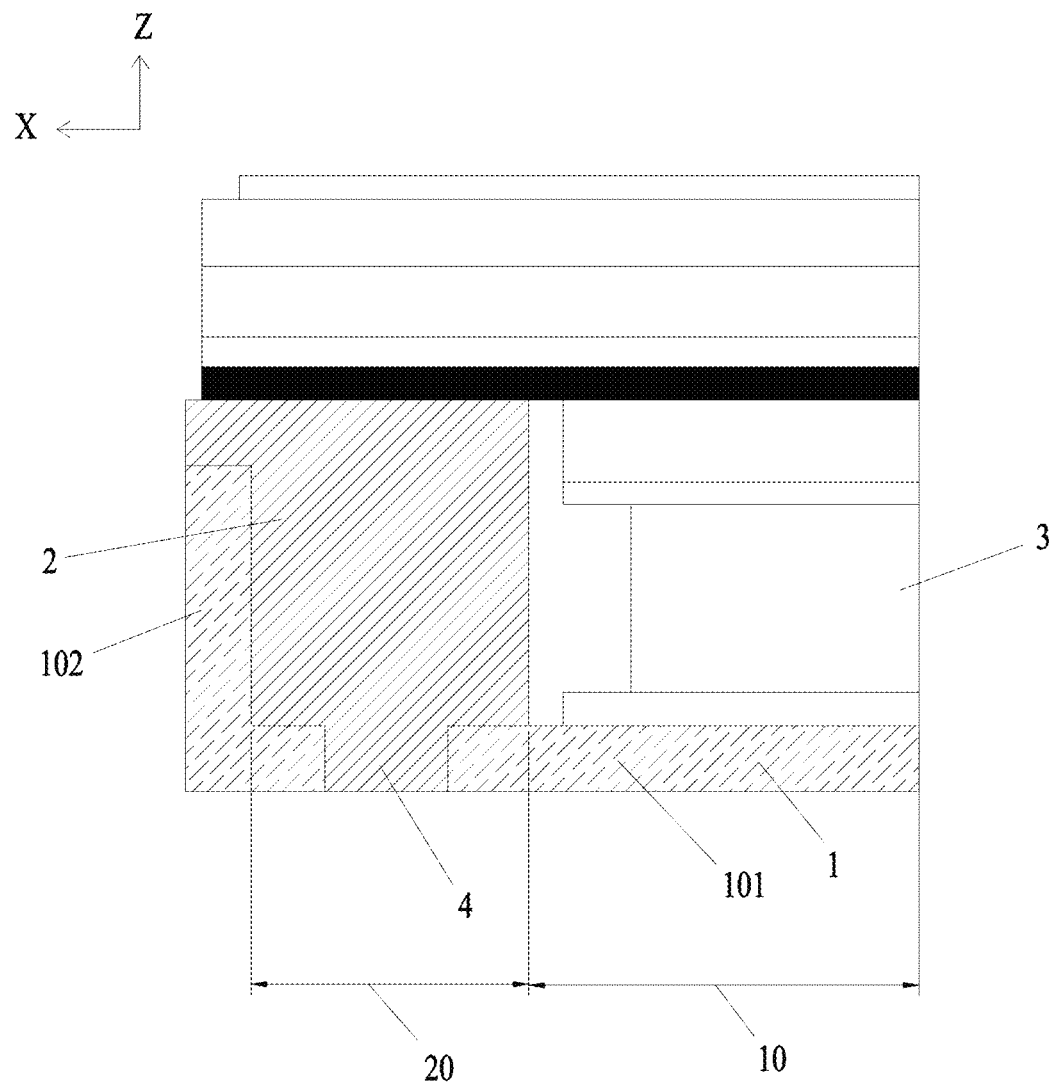
FIG. 3 is a sectional view of a display module in a related art.

FIG. 1 is a schematic diagram of a structure of a display module in the related art. FIG. 2 is an enlarged view of a display module in the related art. FIG. 3 is a sectional view of a display module in a related art. FIG. 2 being an enlarged view at a in FIG. 1 is taken as an example. FIG. 3 being a sectional view at A-A in FIG. 1 is taken as an example. As shown in FIG. 1, FIG. 2, and FIG. 3, a display module includes a back plate 1, a mold frame 2, and a backlight assembly 3. The back plate 1 includes a base plate 101 and a side plate 102, and the side plate 102 is disposed at a peripheral side on the base plate 101 to form an accommodating space with the base plate 101. The mold frame 2 and the backlight assembly 3 are located in the accommodating space. The base plate 101 includes a central region 10 and an edge region 20 around the central region 10, the backlight assembly 3 is disposed on the central region 10, the mold frame 2 is disposed on the edge region 20, and the mold frame 2 is disposed to surround the backlight assembly 3. At least one glue inlet hole 4 is provided on the edge region 20, and a bottom of the mold frame 2 fills the glue inlet hole 4. On one hand, the glue inlet hole 4 can fix the mold frame 2, and on the other hand, in a process of forming the mold frame 2 by injection molding, a material of the mold frame in a molten state can enter the edge region 20 through the glue inlet hole 4 to form the mold frame 2.

The inventor of the present disclosure has found by researching that, when the display module in the related art adopts a narrow bezel design, the glue inlet hole 4 becomes smaller, which leads to deterioration of a binding force between the mold frame 2 and the glue inlet hole 4, and that a fixing strength of the mold frame 2 is reduced, and that a problem of wrinkles of film materials is produced; moreover, it leads to that a sealing performance of the mold frame 2 and the glue inlet hole 4 becomes poor, water vapor easily enters from a gap at a junction between the back plate and the mold frame, resulting in a failure of a display picture.

Figure 4:
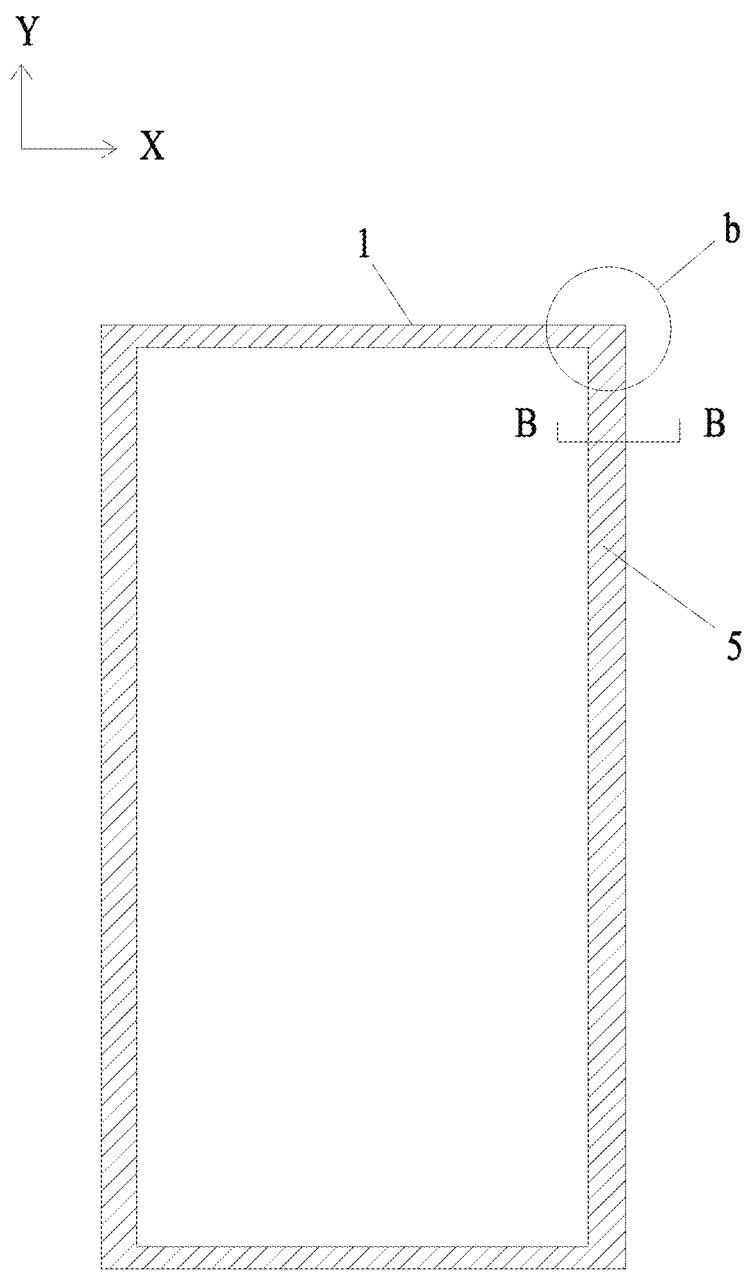
FIG. 4 is a first schematic diagram of a structure of a display module according to an embodiment of the present disclosure.
Figure 5:
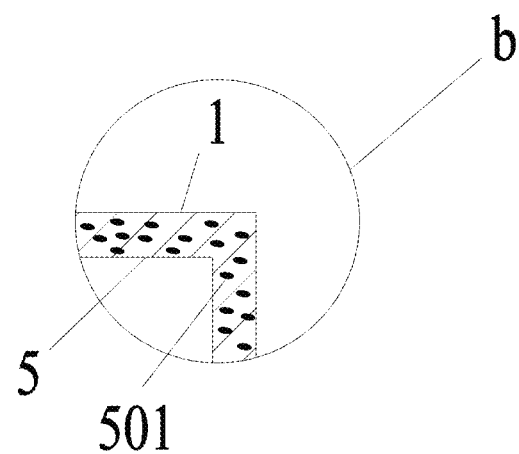
FIG. 5 is a first enlarged view of a display module according to an embodiment of the present disclosure.
Figure 6:
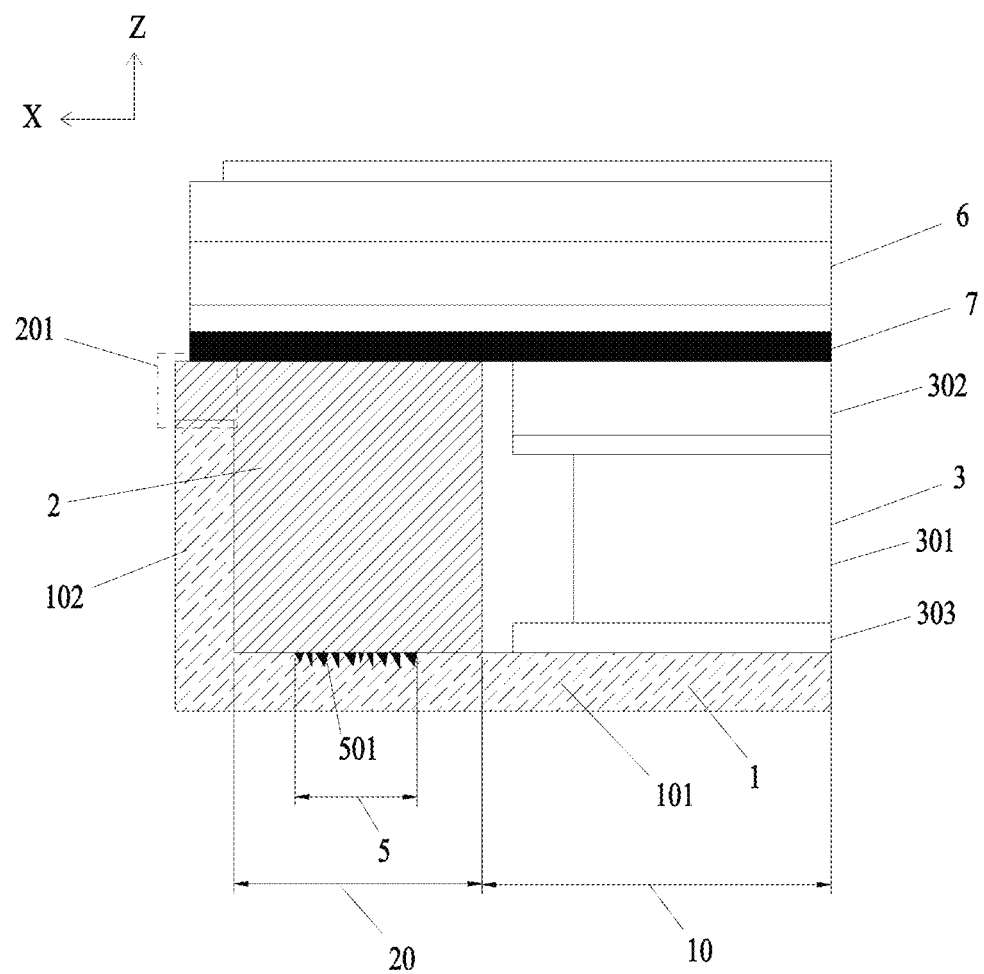
FIG. 6 is a first sectional view of a display module according to an embodiment of the present disclosure.

FIG. 4 is a first schematic diagram of a structure of a display module according to an embodiment of the present disclosure. FIG. 5 is a first enlarged view of a display module according to an embodiment of the present disclosure. FIG. 6 is a first sectional view of a display module according to an embodiment of the present disclosure. FIG. 5 being an enlarged view at b in FIG. 4 is taken as an example. FIG. 6 being a sectional view at B-B in FIG. 4 is taken as an example. As shown in FIGS. 4, 5, and 6, a display module of an embodiment of the present disclosure includes a back plate 1 and a mold frame 2. The back plate 1 includes a base plate 101. The base plate 101 includes an edge region 20, and the edge region 20 corresponds to a bezel region of the display module. The mold frame 2 is disposed on the edge region 20. At least part of the edge region 20 is provided with a rough structure region 5. The rough structure region 5 includes multiple rough structures 501, an orthographic projection of at least part of the rough structures 501 on the base plate 101 overlaps with an orthographic projection of the mold frame 2 on the base plate 101, and a material of the mold frame 2 fills at least part of space of the rough structures 501. Herein, the back plate 1 may be made of a metal material, such as aluminum and its alloy, iron and its alloy, or the like.

The rough structures 501 of the display module according to the embodiment of the present disclosure can increase a binding force between the back plate 1 and the mold frame 2, and the mold frame 2 fills the rough structures 501, so that a gap between the mold frame 2 and the base plate 101 can be sealed to avoid entry of water vapor.

Figure 10:
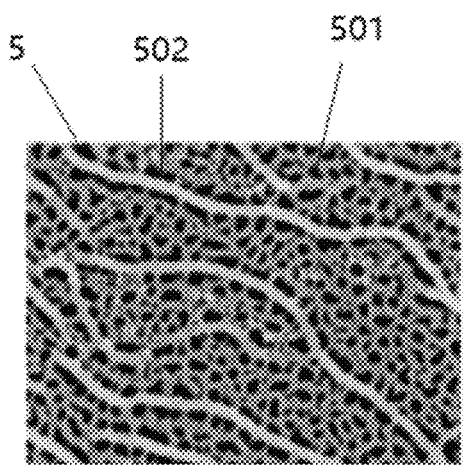
FIG. 10 is a schematic diagram of a structure of a rough structure in a display module according to an embodiment of the present disclosure.

FIG. 10 is a schematic diagram of a structure of a rough structure in a display module according to an embodiment of the present disclosure. In an exemplary embodiment, as shown in FIG. 10, the rough structure 501 may be a groove that does not penetrate the base plate 101. The groove may be a groove at micro-nano scale. The rough structure 501 has an opening 502, wherein the opening 502 is disposed on a surface of the edge region 20 close to the mold frame 2, and a material of the mold frame 2 may fill at least part of space of the rough structure 501 through the opening 502. Herein, the groove at micro-nano scale refers to that an average aperture of the opening of the groove is between 1 nanometer and 1 micron.

In an exemplary embodiment, as shown in FIG. 10, the opening 502 of the rough structure 501 may have a variety of shapes. For example, the shape of the opening 502 of the rough structure 501 may include a regular or irregular shape such as a circle, an ellipse, a rhombus, a rectangle, or the like.

In an exemplary embodiment, as shown in FIG. 10, the opening 502 of the rough structure 501 may have a variety of sizes. For example, the average aperture of the opening 502 of the rough structure 501 is within a range of 50 nm to 120 nm. For example, an average area of the opening 502 of the rough structure 501 in the rough structure region 5 is within a range of 1.5 square microns to 11.5 square microns, so that the rough structure 501 can increase the binding force between the back plate 1 and the mold frame 2 without excessively reducing a strength of the base plate 101. Values of the average aperture and the average area may include endpoint values.

In an exemplary embodiment, as shown in FIG. 10, the rough structure region 5 includes multiple rough structures 501, wherein the multiple rough structures 501 are arranged at intervals so that a surface of the rough structure region 5 close to a side of the mold frame 2 forms a concave-convex surface.

In an exemplary embodiment, cross sections of the rough structures 501 perpendicular to a plane where the rough structure region 5 is located may have a variety of shapes, as long as the material of the mold frame 2 can fill at least part of the space of the rough structures 501. For example, a cross section of a rough structure 501 perpendicular to the plane where the rough structure region 5 is located may be U-shaped; or, the cross section of the rough structure 501 perpendicular to the plane where the rough structure region 5 is located may be arc-shaped; or, the cross section of the rough structure 501 perpendicular to the plane where the rough structure region 5 is located may be V-shaped.

In the display module of the embodiment of the present disclosure, the rough structure region 5 is formed on the edge region 20 by an electrochemical processing technique. In a process of forming the mold frame 2 by injection molding, the material of the mold frame in the molten state enters at least part of the rough structures 501 in the rough structure region 5, and after the mold frame 2 is formed, the material of the mold frame 2 fills at least part of the space of the rough structures 501. The rough structures 501 can increase the binding force between the base plate 101 and the mold frame 2, and seal the gap between the mold frame 2 and the base plate 101, so as to enhance water and oxygen resistance of the display module.

In an exemplary embodiment, a part of the edge region 20 may be provided with the rough structure region 5, or the entirety of the edge region 20 may all be provided with rough structure regions 5.

In the related art, a glue inlet hole 4 is disposed on the base plate 101, wherein the material of the mold frame 2 may fill the glue inlet hole, and a filler and the mold frame 2 form an integral structure. Such arrangement may play a role in fixing the glue inlet hole. However, in an exemplary embodiment of the present disclosure, as shown in FIG. 6, since the display module of the embodiment of the present disclosure can be fixed to the mold frame 2 through the rough structure region 5, the edge region 20 may not be provided with a glue inlet hole, that is, the base plate 101 may be a closed base plate without holes, and a narrow bezel design may be realized.

In an exemplary embodiment, an arrangement of the rough structure region 5 on the edge region 20 may have a variety of forms. For example, the rough structure region 5 is in a closed ring shape on the edge region 20, wherein the closed ring shape is disposed to surround the base plate 101, and covers the edge region 20, as shown in FIG. 4. The rough structures 501 can increase the binding force between the base plate 101 and the mold frame 2, and seal the gap between the mold frame 2 and the base plate 101, so as to enhance the water and oxygen resistance of the display module.

A preparation process of the display module of an embodiment of the present disclosure includes: firstly a back plate 1 is formed; then a material of a mold frame in a molten state is fed through an upper or a side surface of the back plate 1 through a nanometer injection molding process, and the material of the mold frame in the molten state is deposited on the edge region 20, so that the material of the mold frame in the molten state enters at least part of space of the rough structures 501, and finally the mold frame 2 is formed, and the material of the mold frame 2 is made to fill at least part of the space of the rough structures 501.

Figure 7:
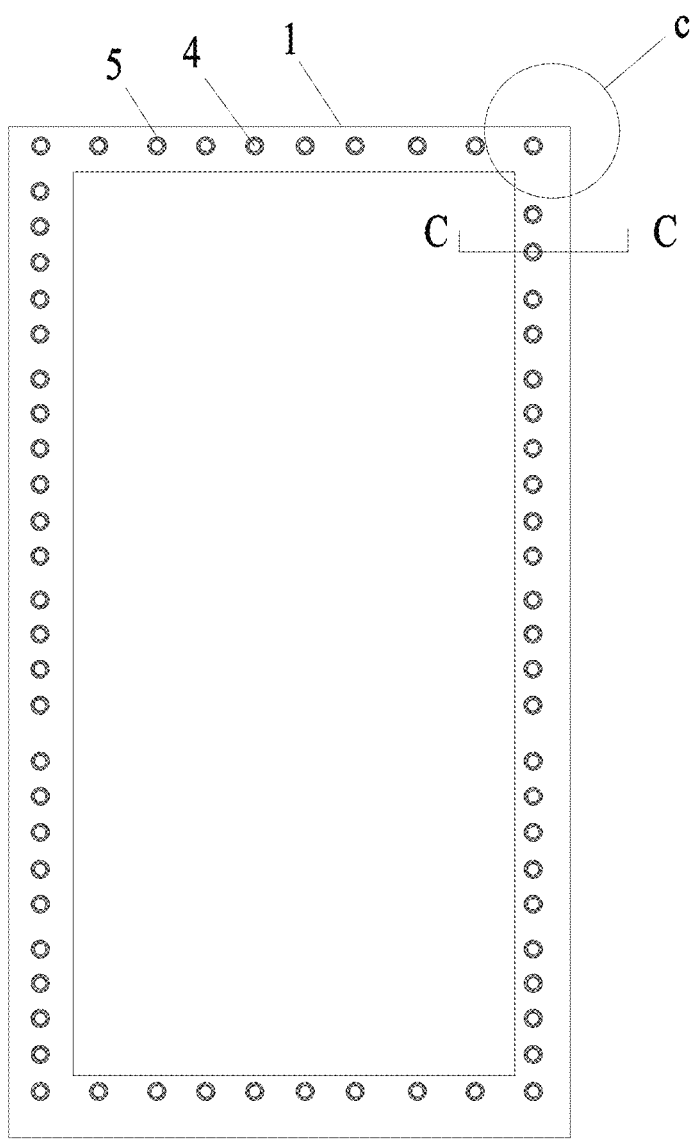
FIG. 7 is a second schematic diagram of a structure of a display module according to an embodiment of the present disclosure.
Figure 8:
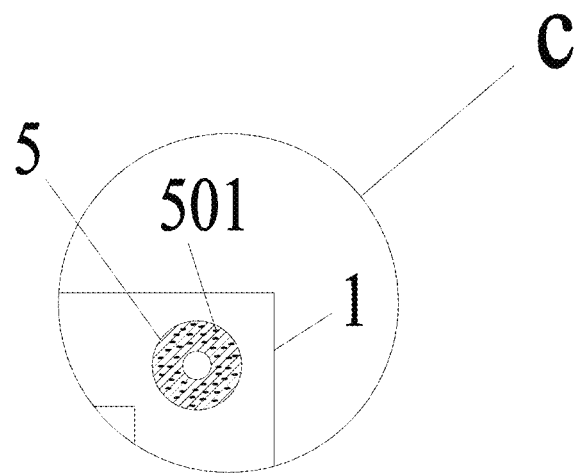
FIG. 8 is a second enlarged view of a display module according to an embodiment of the present disclosure.
Figure 9:
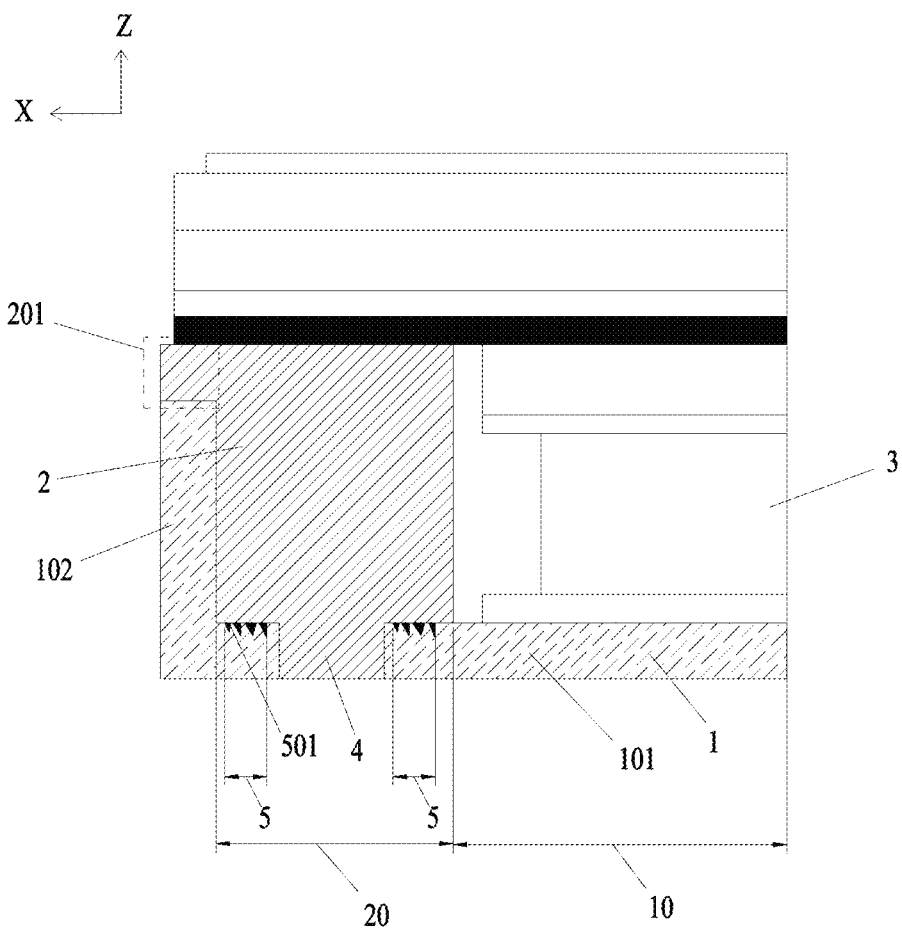
FIG. 9 is a second sectional view of a display module according to an embodiment of the present disclosure.

FIG. 7 is a second schematic diagram of a structure of a display module according to an embodiment of the present disclosure. FIG. 8 is a second enlarged view of a display module according to an embodiment of the present disclosure. FIG. 9 is a second sectional view of a display module according to an embodiment of the present disclosure. FIG. 8 being an enlarged view at c in FIG. 7 is taken as an example. FIG. 9 being a sectional view at C-C in FIG. 7 is taken as an example. In an exemplary embodiment, as shown in FIGS. 7, 8, and 9, at least one glue inlet hole 4 is disposed in at least part of the edge region 20, the glue inlet hole 4 penetrates the base plate 101, and the material of the mold frame 2 fills at least part of space of the glue inlet hole 4. On one hand, the glue inlet hole 4 can fix the mold frame 2, on the other hand, in a process of forming the mold frame 2 by injection molding, the material of the mold frame in the molten state can enter the edge region 20 through the glue inlet hole 4 to form the mold frame 2. Since the rough structure region 5 of the embodiment of the present disclosure may play a role of fixing the mold frame 2, an area of the glue inlet hole 4 on the base plate 101 can be reduced to realize a narrow bezel design. For example, in the related art, an opening of the glue inlet hole is circular and a diameter of the opening of the glue inlet hole may be 0.8 mm, and in the embodiment of the present disclosure, an opening of the glue inlet hole 4 in the display module is circular and a diameter of the opening of the glue inlet hole may be 0.45 to 0.6 mm.

In an exemplary embodiment, an arrangement of glue inlet holes 4 on the edge region 20 may have a variety of forms. For example, as shown in FIG. 4, the rough structure region 5 may be in a closed ring shape on the edge region 20, wherein the closed ring shape is provided to surround the base plate 101 and the rough structure region 5 is provided around the glue inlet holes 4. The rough structures 501 can prevent water vapor and oxygen from entering an inside of the display module through the glue inlet holes 4, and increase the binding force between the base plate 101 and the mold frame 2.

For another example, as shown in FIGS. 7 and 8, the rough structure 501 may be in an island shape only surrounding the glue inlet hole 4 to prevent water vapor and oxygen from entering the inside of the display module through the glue inlet hole 4. In this way, while ensuring reliability of the display module, a process may be simplified, and manufacturing costs of the display module may be saved.

A preparation process of the display module of the embodiment of the present disclosure includes: firstly the back plate 1 is formed; then through a nanometer injection molding process, the material of the mold frame in the molten state passes through the glue inlet hole, and the material of the mold frame in the molten state is deposited on the edge region 20, so that the material of the mold frame in the molten state enters at least part of the space of the rough structures 501, and finally the mold frame 2 is formed, and the material of the mold frame 2 is made to fill at least part of the space of the rough structures 501.

In an exemplary embodiment, as shown in FIG. 6, the display module of the embodiment of the present disclosure further includes a backlight assembly 3, and the base plate 101 further includes a central region 10, wherein the edge region 20 is located around the central region 10, and the central region 10 corresponds to a display region of the display module. The backlight assembly 3 is disposed on the central region 10, and the mold frame 2 surrounds the backlight assembly 3.

In an exemplary embodiment, as shown in FIG. 6, the backlight assembly 3 includes a light guide plate 301 disposed in the central region 10 and an optical film material 302 disposed on a side of the light guide plate 301 away from the central region 10. Herein, the optical film material 302 includes at least one of a diffusion film, a prism film, a composite film, and a brightness enhancement film.

In an exemplary embodiment, as shown in FIG. 6, the backlight assembly 3 further includes a reflective layer 303, wherein the reflective layer 303 is disposed between the light guide plate 301 and the central region 10, and the reflective layer 303 is used for reflecting light rays emitted from the light guide plate 301 in a direction close to the central region 10 into the light guide plate 301 to form light rays emitted in a direction away from the central region 10, thereby increasing outgoing light rays of the backlight assembly 3.

In an exemplary embodiment, as shown in FIG. 6, the display module of the embodiment of the present disclosure further includes a display panel 6, wherein the display panel 6 is disposed on a side of the mold frame 2 away from the base plate 101, and the display panel 6 is used for displaying an image.

In an exemplary embodiment, as shown in FIG. 6, the display panel 6 may be a liquid crystal display panel. For example, the display panel 6 may include a first polarizer, an array substrate, a liquid crystal layer, a color film substrate, and a second polarizer which are stacked in sequence.

In an exemplary embodiment, as shown in FIG. 6, the display module of the embodiment of the present disclosure further includes a light shielding layer 7, wherein the light shielding layer 7 is disposed on a side of the mold frame 2 away from the base plate 101 and between the mold frame 2 and the display panel 6. An orthographic projection of the light shielding layer 7 on the base plate 101 at least partially overlaps with an orthographic projection of the mold frame 2 on the base plate 101. A side of the light shielding layer 7 may be fixed on the mold frame 2, and another side of the light shielding layer may be fixed on an edge of the backlight assembly 3. The orthographic projection of the light shielding layer 7 on the base plate 101 and an orthographic projection of a display region of the display panel on the base plate 101 do not overlap, thereby preventing the light shielding layer 7 from affecting normal display of a picture in the display region. The light shielding layer 7 adopts a light shielding material, which may cover the periphery of an edge of the display module, thereby avoiding a problem that light leakage is produced in the display module.

In an exemplary embodiment, as shown in FIGS. 6 and 8, the back plate 1 further includes a side plate 102, wherein the side plate 102 is located at a peripheral side on the base plate 101, the side plate 102 forms an accommodation space with the base plate 101, and the mold frame 2 and the backlight assembly 3 are located in the accommodation space. Optionally, an extending surface of the side plate 102 may be perpendicular to an extending surface of the base plate 101.

In an exemplary embodiment, as shown in FIGS. 6 and 8, a side of the mold frame 2 close to the side plate 102 is provided with a boss 201, wherein the boss 201 is located at an end of the side plate 102 away from the base plate 101, and a vertical projection of the boss 201 on the base plate 101 at least partially overlaps with a vertical projection of the side plate 102 on the base plate 101 to avoid burr exposure produced by the side plate 102, thus having a protective effect.

In an exemplary embodiment, as shown in FIG. 6, in a preparation process of the mold frame 2 in the embodiment of the present disclosure, the material of the mold frame in the molten state may be deposited on the edge region 20 from above the side plate 102, and part of the material of the mold frame in the molten state may be deposited on the end of the side plate 102 away from the base plate 101 and after the mold frame 2 is formed, the material of the mold frame in the molten state located at the end of the side plate 102 away from the base plate 101 forms the boss 201.

An embodiment of the present disclosure further provides a method for preparing a display module, including: forming a back plate, wherein the back plate includes a base plate, and the base plate includes an edge region; forming a rough structure on at least part of the edge region; wherein the rough structure may be formed on at least part of the edge region by an electrochemical processing process;
    forming a mold frame on the edge region, and filling at least part of the mold frame in the rough structure.

An embodiment of the present disclosure further provides a display device, including any one of the display modules described above. The display device includes a mobile phone, a tablet computer, a smart wearable product (such as a smart watch, a bracelet, or the like), a personal digital assistant (PDA), a vehicle-mounted computer, or the like. The embodiment of the present disclosure does not specially limit a specific form of the above display device.

The drawings of the present disclosure only involve structures involved in the present disclosure, and other structures may refer to conventional designs. The embodiments in the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. A display module, comprising a back plate and a mold frame, wherein the back plate comprises a base plate, the base plate comprises an edge region, the mold frame is disposed on the edge region, the edge region is provided with a rough structure region, the rough structure region comprises a plurality of rough structures, an orthographic projection of at least part of the rough structures on the base plate overlaps with an orthographic projection of the mold frame on the base plate, and a material of the mold frame fills at least part of space of the rough structures, and
wherein the back plate further comprises a side plate, the side plate is located at a peripheral side on the base plate, a side of the mold frame close to the side plate is provided with a boss, the boss is located at an end of the side plate away from the base plate, and a vertical projection of the boss on the base plate at least partially overlaps with a vertical projection of the side plate on the base plate.

2. The display module of claim 1, wherein a rough structure is a groove at micro-nano scale.

3. The display module of claim 2, wherein a cross-sectional shape of the groove perpendicular to a plane where the rough structure region is located comprises at least one of a U-shape, an arc shape, and a V-shape.

4. The display module of claim 2, wherein an average area of an opening of the rough structure in the rough structure region is within a range of 1.5 square microns to 11.5 square microns.

5. The display module of claim 1, wherein the edge region is provided with a glue inlet hole, the glue inlet hole penetrates the base plate, the material of the mold frame fills at least part of space of the glue inlet hole.

6. The display module of claim 5, wherein an opening of the glue inlet hole is circular, and a diameter of the opening of the glue inlet hole is 0.45 mm to 0.6 mm.

7. The display module of claim 6, wherein the rough structure region is in a closed ring shape on the edge region.

8. The display module of claim 5, wherein the rough structure region is in a closed ring shape on the edge region.

9. The display module of claim 8, wherein the closed ring shape is provided to surround the base plate and the rough structure region is provided around the glue inlet hole.

10. The display module of claim 5, wherein a rough structure is arranged in an island shape only surrounding the glue inlet hole.

11. The display module of claim 1, wherein the base plate is not provided with a glue inlet hole.

12. The display module of claim 11, wherein the rough structure region is in a closed ring shape on the edge region.

13. The display module of claim 1, further comprising a backlight assembly, the base plate further comprises a central region, the edge region is located around the central region, the backlight assembly is disposed on the central region, and the mold frame surrounds the backlight assembly.

14. The display module of claim 1, further comprising a display panel, wherein the display panel is disposed on a side of the mold frame away from the base plate.

15. A display device, comprising: the display module of claim 1.

16. The display module of claim 1, wherein the rough structure region is provided to surround the glue inlet hole.

17. The display module of claim 16, wherein the rough structure region is in a closed ring shape on the edge region.

18. A method for preparing a display module, comprising:
forming a back plate, wherein the back plate comprises a base plate, and the base plate comprises an edge region;
forming a rough structure on at least part of the edge region; and
forming a mold frame on the edge region, and filling at least part of the mold frame in the rough structure,
wherein the back plate further comprises a side plate, the side plate is located at a peripheral side on the base plate, a side of the mold frame close to the side plate is provided with a boss, the boss is located at an end of the side plate away from the base plate, and a vertical projection of the boss on the base plate at least partially overlaps with a vertical projection of the side plate on the base plate.

19. The method for preparing the display module of claim 18, wherein the rough structure is formed on at least part of the edge region by an electrochemical processing process.

* * * * *